(12) United States Patent
Kaji

(10) Patent No.: US 10,343,464 B2
(45) Date of Patent: Jul. 9, 2019

(54) PNEUMATIC TIRE AND MOLDING DIE THEREOF

(71) Applicant: Toyo Tire & Rubber Co., Ltd., Osaka-shi, Osaka (JP)

(72) Inventor: Shinichi Kaji, Osaka (JP)

(73) Assignee: Toyo Tire Corporation, Itami-shi, Hyogo (JP)

( * ) Notice: Subject to any disclaimer, the term of this patent is extended or adjusted under 35 U.S.C. 154(b) by 391 days.

(21) Appl. No.: 14/969,177

(22) Filed: Dec. 15, 2015

(65) Prior Publication Data
US 2016/0185162 A1    Jun. 30, 2016

(30) Foreign Application Priority Data
Dec. 25, 2014 (JP) .................................. 2014-262729

(51) Int. Cl.
*B29D 30/06* (2006.01)
*B60C 11/12* (2006.01)
(Continued)

(52) U.S. Cl.
CPC .......... *B60C 11/1281* (2013.01); *B29D 30/06* (2013.01); *B29D 30/0606* (2013.01);
(Continued)

(58) Field of Classification Search
CPC ........ B29D 2030/0613; B29D 30/0606; B29D 2030/0616; B60C 11/1281; B60C 2011/1254; B60C 2011/1209
See application file for complete search history.

(56) References Cited

U.S. PATENT DOCUMENTS 6,116,310 A * 9/2000 Shinohara ............... B60C 11/12
152/209.21
2002/0134202 A1* 9/2002 Domange .................... 76/101.1
(Continued)

FOREIGN PATENT DOCUMENTS

JP         2-241806 A       9/1990
JP        02-303908 A  *  12/1990
(Continued)

OTHER PUBLICATIONS

Machine translation for Japan 2000-102925 (Year: 2011).*
(Continued)

*Primary Examiner* — Steven D Maki
(74) *Attorney, Agent, or Firm* — Westerman, Hattori, Daniels & Adrian, LLP

(57) ABSTRACT

A sipe is provided to a land portion provided to a tread of a pneumatic tire. The sipe is formed of a wide portion having a groove width W1 and a narrow portion having a groove width W2 narrower than the groove width W1. The wide portion extends in a sipe depth direction D at both ends in a sipe length direction L and extends in the sipe length direction L at an upper end in the sipe depth direction D. The narrow portion is surrounded by the wide portion on three sides including both sides in the sipe length direction L and an opening side in the sipe depth direction D and extends to a sipe bottom. Consequently, chipping of rubber is suppressed by reducing pulling resistance of a sipe plate at the time of die releasing of a tire while suppressing breakage of the sipe plate.

6 Claims, 7 Drawing Sheets

(51) Int. Cl.
  *B29D 30/68* (2006.01)
  *B60C 11/11* (2006.01)
  *B60C 11/03* (2006.01)
  *B60C 11/13* (2006.01)

(52) U.S. Cl.
  CPC .............. *B29D 30/68* (2013.01); *B60C 11/11* (2013.01); *B60C 11/1218* (2013.01); *B29D 2030/0613* (2013.01); *B29D 2030/0616* (2013.01); *B29K 2995/0072* (2013.01); *B60C 2011/0334* (2013.01); *B60C 2011/1209* (2013.01); *B60C 2011/1254* (2013.01); *B60C 2011/1338* (2013.01)

(56) References Cited

U.S. PATENT DOCUMENTS

| | | |
|---|---|---|
| 2002/0139164 A1 | 10/2002 | Ishihara |
| 2004/0187993 A1 | 9/2004 | Lagnier |
| 2012/0227879 A1 | 9/2012 | Muhlhoff et al. |
| 2017/0305200 A1 | 10/2017 | Furusawa |

FOREIGN PATENT DOCUMENTS

| | | | |
|---|---|---|---|
| JP | 2-303908 A | | 12/1990 |
| JP | 03-189112 A | * | 8/1991 |
| JP | 3-189112 A | | 8/1991 |
| JP | 07-52613 A | | 2/1995 |
| JP | 8-175115 A | | 7/1996 |
| JP | 8-258515 A | | 10/1996 |
| JP | 11-42913 A | | 2/1999 |
| JP | 11-170818 A | | 6/1999 |
| JP | 2000-102925 A | * | 4/2000 |
| JP | 2002-187413 A | | 7/2002 |
| JP | 2004-224213 A | | 8/2004 |
| JP | 2005-505456 A | | 2/2005 |
| JP | 2006-001491 A | * | 1/2006 |
| JP | 2012-240453 A | | 12/2012 |

OTHER PUBLICATIONS

Machine translation for Japan 2006-001491 (Year: 2018).*
Machine translation for Japan 03-189112 (Year: 2018).*
Machine translation for Japan 02-303908 (Year: 2016).*
Office Action dated Aug. 21, 2017, issued in counterpart Chinese Application No. 201510994120.2, with English machine translation. (10 pages).
Office Action dated Mar. 1, 2017, issued in counterpart Chinese Application No. 20150995839.8 (counterpart to U.S. Appl. No. 14/972,240), with machine translation. (13 pages).
Office Action dated Feb. 3, 2017, issued in counterpart Chinese Patent Application No. 201510994120.2, with machine translation. (15 pages).
Office Action dated Feb. 23, 2018, issued in counterpart Chinese Application No. 201510994120.2, with English machine translation. (10 pages).
Final Office Action dated Jul. 26, 2018, issued in U.S. Appl. No. 14/972,240. (14 pages).
Office Action dated May 29, 2018, issued in counterpart Japanese Application No. 2014-262729, with English machine translation. (7 pages).

* cited by examiner

COMPARATIVE EXAMPLE 3

PNEUMATIC TIRE AND MOLDING DIE THEREOF

CROSS-REFERENCE TO RELATED APPLICATIONS

This application is based upon and claims the benefit of priority from the prior Japanese Patent Application No. 2014-262729, filed on Dec. 25, 2014; the entire contents of which are incorporated herein by reference.

BACKGROUND

1. Technical Field

The present invention relates to a pneumatic tire and a molding die thereof.

2. Related Art

Snow tires (studless tires), for example, have incisions called sipes which are made in land portions, such as blocks and ribs. An edge effect by the sipes enables stable running on a road surface covered with snow and ice where a frictional coefficient is low. Whereas the sipes obtain the effect as above, as is shown in FIG. 9, a sipe 101 lowers rigidity of a land portion 102 and the land portion 102 undergoes deformation (collapses) to a greater extent when making contact with the ground. Such deformation may possibly reduce the edge effect contrary to the intention or lower resistance to irregular wear.

In order to suppress deformation of the land portions when making contact with the ground, increasing frictional resistance between a pair of opposing wall surfaces of a sipe by providing 20 to 300 μm irregularities to a pair of the wall surfaces (see JP-A-8-175115) or narrowing a groove width of a sipe has been proposed.

As a method of narrowing the groove width of a sipe, for example, JP-A-11-170818 discloses that a groove width of a sipe is made narrower in an intermediate portion in a sipe length direction than at both ends. JP-A-11-42913 discloses that a groove width of a sipe is set to 0.1 to 0.3 mm, which is narrower than a typical groove width, and also to provide a pillar-like space extending in a sipe depth direction to reinforce a sipe plate. JP-A-2-241806 and JP-A-2-303908 disclose to provide a sipe with a narrow portion or a knife cut portion having a narrow groove width and a wide portion having a wide groove width and surrounding the narrow portion or the knife cut portion at least partially.

When a sipe having a narrow groove width as above is provided, a sipe plate to shape the sipe becomes thinner, which raises a concern about breakage of the sipe plate over repetitive use for molding of a tire by vulcanization. In order to enhance a breakage suppressing effect on the sipe plate, it is effective to surround a thin plate portion of the sipe plate with a thick portion as are described in JP-A-2-241806 and JP-A-2-303908. However, when the thin plate portion is surrounded by providing a thick portion at a tip end of the sipe plate (that is, when a sipe is provided with a wide portion having a wide groove width at a sipe bottom and a narrow portion having a narrow groove width on top of the wide portion), problems as follows are raised. That is, in this case, resistance of the sipe plate is large when pulled out from the surface of tread rubber at the time of die releasing of a tire (that is, when a tire molded by vulcanization is released from the molding die), and large resistance causes chipping of rubber.

SUMMARY

In view of the foregoing, embodiments of the invention have an object to provide a pneumatic tire provided with a sipe having a partially narrowed groove width with the aim of suppressing deformation of a land portion when making contact with the ground, which is capable of suppressing chipping of rubber by reducing pulling resistance of a sipe plate at the time of die releasing of a tire while suppressing breakage of the sipe plate, and a molding die thereof.

According to the embodiments, a pneumatic tire includes a land portion provided to a tread, and a sipe provided to the land portion. The sipe includes a wide portion having a first groove width, which extends in a sipe depth direction at both ends in a sipe length direction and extends in a sipe length direction at an upper end in the sipe depth direction, and a narrow portion having a second groove width narrower than the first groove width, which is surrounded by the wide portion on three sides including both sides in the sipe length direction and an opening side in the sipe depth direction and extends to a sipe bottom. Regarding the terms, "wide portion" and "narrow portion", "wide" and "narrow" are used to specify which one of the two portions has a groove width wider or narrower than the other. In other words, the wide portion has a wider groove width than the narrow portion and the narrow portion has a narrower groove width than the wide portion.

According to the embodiments, a molding die of a pneumatic tire includes a sipe plate to shape a sipe in a land portion provided to a tread. The sipe plate includes a frame-like portion formed of a lower frame portion extending along a root portion to a molding die main body and side frame portions extending in a height direction from both ends of the lower frame portion, and a thin plate portion having a thickness thinner than a thickness of the frame-like portion, which is surrounded by the frame-like portion on three sides except for a tip end side corresponding to a sipe bottom and extends to a tip end.

According to the embodiments, chipping of rubber can be suppressed by reducing pulling resistance of a sipe plate while suppressing breakage of the sipe plate in a pneumatic tire provided with a sipe having a partially narrowed groove width with the aim of suppressing deformation of a land portion when the tire makes contact with the ground.

DETAILED DESCRIPTION

Hereinafter; embodiments of the invention will be described according to the drawings.

First Embodiment

A pneumatic tire according to a first embodiment is formed of a pair of bead portions and side wall portions on the right and left, and a tread portion 10 provided between the side wall portions on the right and left so as to connect the both side wall portions along outer edges in a radial direction, but the illustration is omitted herein. The pneumatic tire can adopt a typical tire structure except for a tread pattern.

Figure 1:
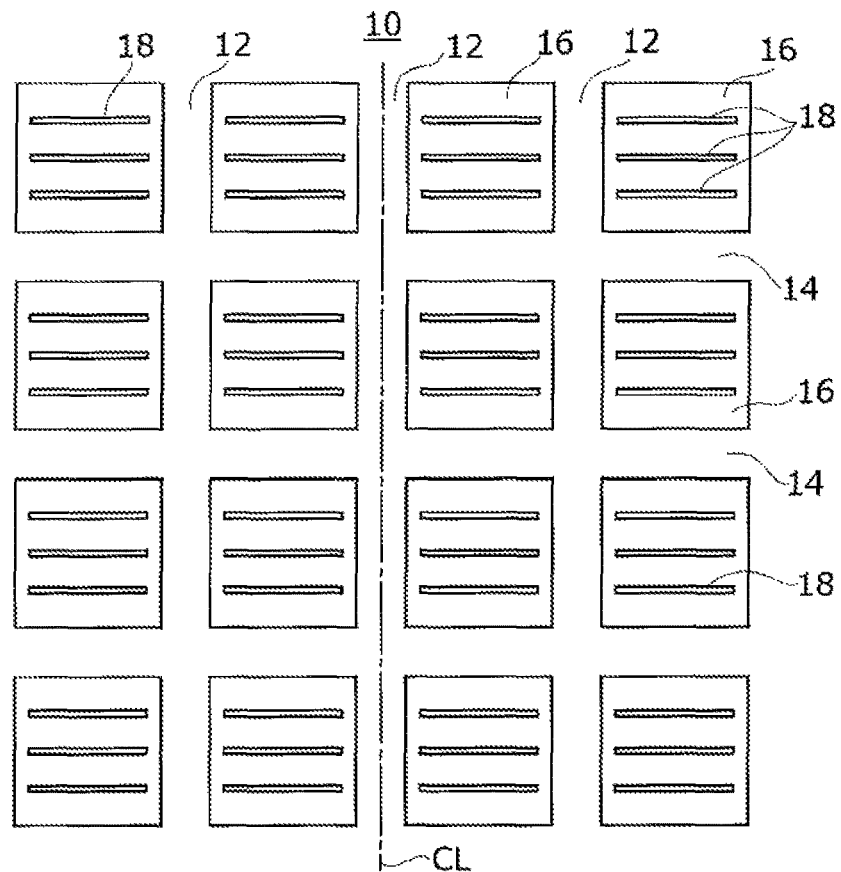
FIG. 1 is a developed view showing a tread pattern of a pneumatic tire according to a first embodiment.

As is shown in FIG. 1, a plurality of main grooves (grooves in a circumferential direction) 12 extending in a tire circumferential direction and a plurality of traverse grooves (grooves in a width direction) 14 extending in a direction (tire width direction) intersecting with the main grooves 12 are provided to a surface of the tread portion 10. The main grooves 12 and the traverse grooves 14 together define blocks 16 as a plurality of land portions. Each block 16 is provided with a sipe 18 extending in a direction intersecting with the tire circumferential direction. Herein, the sipe 18 is an incision that does not open to a block edge at both ends in a sipe length direction (that is, an incision that terminates within the block 16 without opening to the main grooves 12), and is therefore referred to as a closed sipe. In FIG. 1, CL denotes a tire equator.

Figure 2:
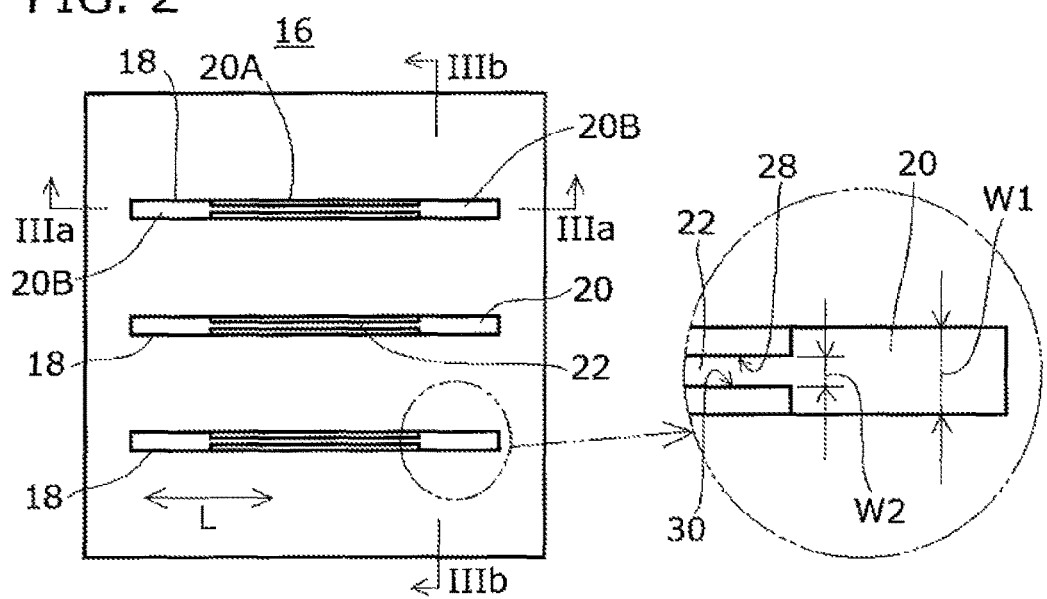
FIG. 2 is a plan view of a block of the first embodiment with an inset showing a partially enlarged view.

As is shown in FIG. 2 in enlargement, the sipe 18 is a linear sipe extending parallel to the tire width direction and three sipes 18 are provided to each block 16. Also, as is shown in FIG. 3B, the sipe 18 is of a linear shape that extends in a tire radial direction in cross section across the width, in a sipe depth direction D. Only one or at least two sipes 18 spaced apart in the tire circumferential direction may be provided to each block 16. Alternatively, the sipe 18 may extend at an angle with respect to the tire width direction. Further, the sipe 18 is not limited to the linear sipe when viewed in a plane as shown in FIG. 2, and may be a wave-like sipe (that is, a sipe having a wave-like opening) when viewed in a plane.

The sipe 18 is formed of a wide portion 20 having a groove width (referred to also as a sipe width) W1 of 0.6 to 1.5 mm, which is a typical sipe width, and a narrow portion 22 having a groove width W2 narrower than the groove width W1 of the wide portion 20. The groove width W1 of the wide portion 20 may be 0.7 to 1.3 mm.

Figure 3A:
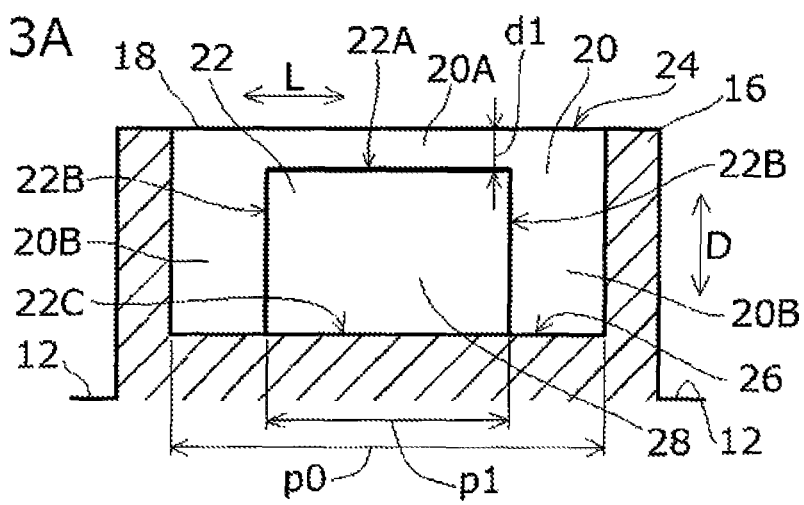
FIG. 3A is a sectional view taken along the line IIIa-IIIa of FIG. 2
Figure 3B:
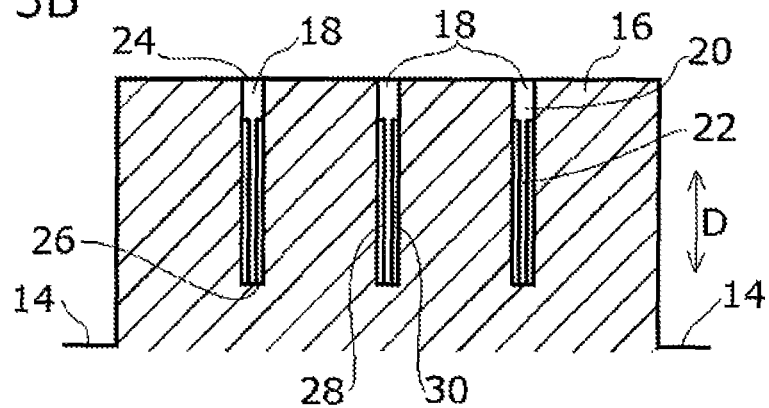
FIG. 3B is a sectional view taken along the line IIIb-IIIb of FIG. 2.

As are shown in FIG. 2 and FIGS. 3A and 3B, the wide portion 20 is a frame-like portion extending fully in the sipe depth direction D at both ends in a sipe length direction L and also extending fully in the sipe length direction L at an upper end in the sipe depth direction D (a portion located along a sipe opening 24 in the sipe depth direction D). In other words, the wide portion 20 is formed of an opening-side portion 20A extending in the sipe length direction L at the upper end in the sipe depth direction D and side-edge portions 20B and 20B on the right and left extending in the sipe depth direction D at the both ends in the sipe length direction L.

Meanwhile, the narrow portion 22 is a portion surrounded by the wide portion 20 on three sides, namely, both sides in the sipe length direction L and an opening side in the sipe depth direction D, and extends to a sipe bottom 26 in the sipe depth direction D. The narrow portion 22 is a rectangular region provided in a center region in the sipe length direction L, and situated next to the opening-side portion 20A via an upper side 22A on the side of the sipe opening 24 and situated next to the side-edge portions 20B and 20B on the right and left via two lateral sides 22B and 22B on the right and left on the both sides in the sipe length direction L. On the other hand, a bottom side 22C of the narrow portion 22 is not situated next to the wide portion 20 and coincides with the sipe bottom 26.

Owing to the configuration as above, the sipe 18 is formed in such a manner so as to have the constant groove width W1 by the wide portion 20 at the position of the opening 24 which corresponds to a surface of tread. At the both ends in the length direction L, the sipe 18 is formed in such a manner so as to have the constant groove width W1 from the opening 24 to the sipe bottom 26 by the wide portion 20. Meanwhile, at the center in the length direction L, the sipe 18 is formed in such a manner that the sipe 18 has the groove width W1 at the position of the opening 24 by the wide portion 20 whereas the groove width is made narrower by the narrow portion 22 having the groove width W2 from some midpoint in the depth direction D for the sipe 18 to have the constant narrow groove width W2 to the sipe bottom 26. A depth position of the upper side 22A (that is, a distance d1 from the opening 24 to the upper side 22A), which is a boundary between the wide portion 20 and the narrow portion 22, is not particularly limited, and may be, for example, 1 to 3 mm. A dimension p1 of the narrow portion 22 in the sipe length direction L preferably accounts for 40% or more, and more preferably, 50 to 80% of a full length p0 of the sipe 18 with the aim of enhancing a collapse suppressing effect on the block 16 when making contact with the ground.

As has been described, the groove width W2 of the narrow portion 22 (an interval between a pair of opposing wall surfaces 28 and 30 of the narrow portion 22) is narrower than the groove width W1 of the wide portion 20 (W2<W1). The groove width W2 is preferably 0.6 mm or less, more preferably 0.4 mm or less, and further preferably 0.3 mm or less. The smaller a value of the groove width W2 becomes, the greater will be an attraction effect by water described later. Hence, the groove width W2 has no particular lower limit and may be, for example, 0.1 mm or greater.

It is preferable for the narrow portion 22 that an arithmetic mean roughness Ra on a pair of the opposing wall surfaces (groove wall surfaces) 28 and 30 is set to 1.6 μm or less. In other words, the wall surfaces 28 and 30 of the narrow portion 22 herein are made smooth or made into a mirror-smooth state in comparison with typical sipe wall surfaces in the related art. The arithmetic mean roughness Ra on the wall surfaces 28 and 30 is preferably 1.3 μm or less, and more preferably 1.0 μm or less. The smaller a value of the arithmetic mean roughness Ra becomes, the smoother are the wall surfaces 28 and 30 and the greater will be the attraction effect by water described below. Hence, the arithmetic mean roughness Ra has no particular lower limit and may be, for example, 0.1 μm or greater, or 0.5 μm or greater.

Herein, the arithmetic mean roughness Ra is defined according to JIS B0601:2013. More specifically, the arithmetic mean roughness Ra is a value obtained by extracting a reference length alone from a roughness curve in a direction of a mean line, adding up an absolute value of a deviation from the mean line to a measured curve of the extracted portion, and computing an average of a total.

The arithmetic mean roughness Ra on a pair of opposing wall surfaces of the wide portion 20 is not particularly limited, and the arithmetic mean roughness Ra may be, for example, 2.5 μm or greater, which is a surface roughness of typical sipe wall surfaces.

Figure 4:
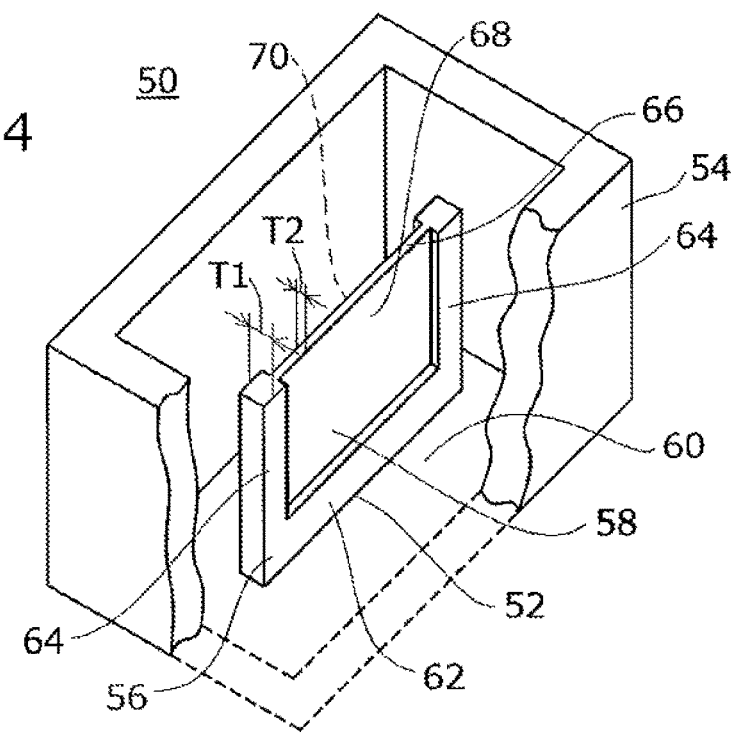
FIG. 4 is an enlarged perspective view of a major portion of a tire molding die to show a sipe plate according to the first embodiment.

FIG. 4 shows a major portion of a tire molding die (molding metal die) 50 provided with a sipe plate 52 which is a metal plate to shape the sipe 18 in the block 16. In FIG. 4, numeral 54 denotes a rib to shape the main grooves 12 and the traverse grooves 14, which is shown schematically in a partially cut-out state.

The sipe plate 52 is of a shape conforming to the sipe shape as described above and formed of a frame-like portion 56 having a thickness T1 of 0.6 to 1.5 mm, which is a thickness of a typical sipe plate, and a thin plate portion 58 having a thickness T2 thinner than the thickness T1 of the frame-like portion 56.

The frame-like portion 56 is formed of a lower frame portion 62 extending along a root portion to a molding die main body 60, and a pair of side frame portions 64 and 64 on the right and left extending in a height direction from both ends of the lower frame portion 60. The lower frame portion 62 is formed fully in the root portion (that is, in a full width of the sipe plate 52) in a width direction of the sipe plate 52, which corresponds to the sipe length direction L. The side frame portions 64 are formed fully in height of the sipe plate 52.

The thin plate portion 58 is surrounded by the frame-like portion 56 on three sides except for a side of a tip end 66 which corresponds to the sipe bottom 26, and extends to the tip end 66 in the height direction of the sipe plate 52. The thin plate portion 58 is a rectangular portion provided to the sipe plate 52 at a center region in the width direction, and situated next to the lower frame portion 62 on the side of the root portion and situated next to the side frame portions 64 and 64 on the right and left on the both sides in the width direction. It should be noted, however, that the tip end 66 is not surrounded by the frame-like portion 56.

As with the narrow portion 22 of the sipe 18, the thickness 12 of the thin plate portion 58 is preferably 0.6 mm or less, more preferably 0.4 mm or less, and further preferably 0.3 mm or less. The lower limit may be, for example, 0.1 mm or greater.

It is preferable for the thin plate portion 58 that the arithmetic mean roughness Ra on a pair of side surfaces 68 and 70 that shape a pair of the wall surfaces 28 and 30 of the narrow portion 22 is set to 1.8 μm or less. Generally, a surface roughness on sipe wall surfaces transferred from both of two side surfaces of the sipe plate is lower than a surface roughness on the side surfaces of the sipe plate. Hence, by setting the arithmetic mean roughness Ra on the side surfaces 68 and 70 of the thin plate portion 58 to 1.8 μm or less, the arithmetic mean roughness Ra on the wall surfaces 28 and 30 of the narrow portion 22 can be set to 1.6 μm or less. The arithmetic mean roughness Ra on the side surfaces 68 and 70 of the thin plate portion 58 is preferably 1.6 μm or less, and more preferably 1.3 μm or less. The lower limit may be, for example, 0.1 μm or greater, or 0.5 μm or greater. The arithmetic mean roughness Ra on a pair of wall surfaces of the frame-like portion 56 is not particularly limited, and the arithmetic mean roughness Ra may be, for example, 2.5 μm or greater, which is a surface roughness of a typical sipe plate.

For configurations other than the sipe plate 52, the tire molding die 50 can adopt a structure of a typical tire molding die. In this embodiment, a plurality of sipe plates 52 are planted in a die surface of the tire molding die 50 at positions corresponding to the sipes 18. The pneumatic tire described as above can be manufactured by subjecting an unvulcanized green tire to molding by vulcanization in an ordinary manner using the tire molding die 50. In a fabrication sequence of a tire molding die, it is general to apply sand blasting after the sipe plates are attached to the die surface in order to make the entire die surface smooth. Hence, surfaces of the side surfaces 68 and 70 of the thin plate portions 58 of the sipe plates 52 are also roughened unless some measures are taken. For this reason, it may be configured in this embodiment in such a manner that sand blasting is applied while the side surfaces 68 and 70 of the thin plate portion 58 are covered with a masking sheet and the masking sheet is removed after the sand blasting. Alternatively, it may be configured in such a manner that sand blasting is applied without using a masking sheet first and then the side surfaces 68 and 70 of the thin plate portion 58 are polished so as to have the predetermined arithmetic mean roughness Ra.

According to this embodiment described above, by providing the narrow portion 22, breakage of the sipe plate 52 can be suppressed during the manufacturing of a tire and chipping of rubber can be suppressed by reducing pulling resistance of the sipe plate 52 while suppressing deformation of the block 16 when the tire makes contact with the ground.

Figure 5:
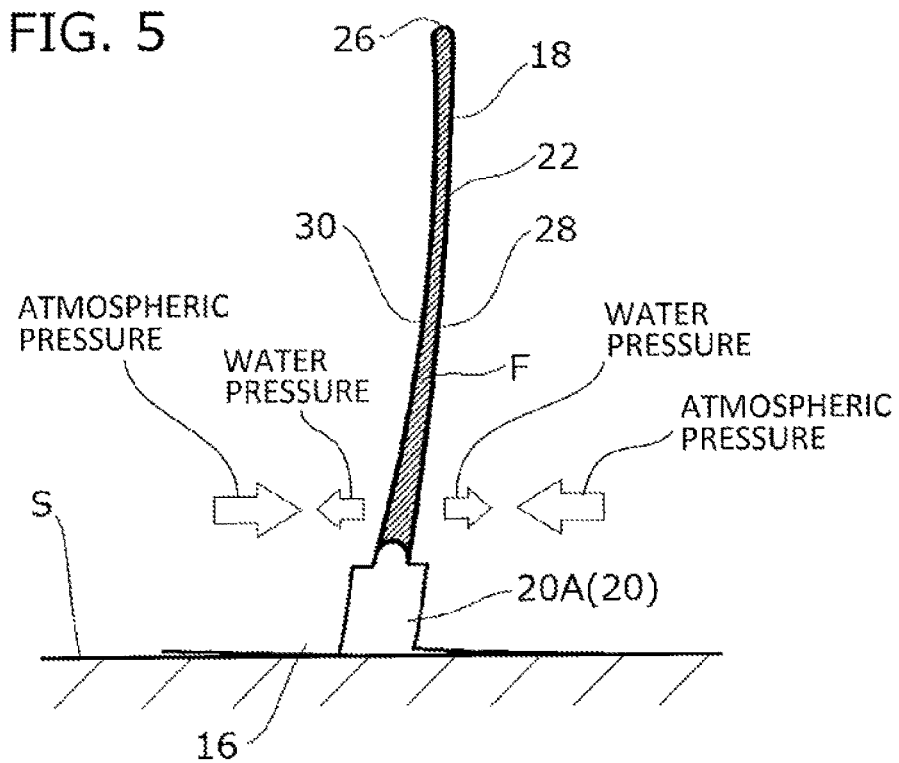
FIG. 5 is an enlarged sectional view of the block of the first embodiment to show a state when a tire makes contact with the ground.

More specifically, by providing the sipe 18 with the narrow portion 22 having a narrower groove width and higher surface smoothness than a sipe in the related art, water is trapped inside the narrow portion 22 as is shown in FIG. 5 when the block 16 makes contact with a road surface S containing moisture, such as a road surface covered with snow and ice, which allows the opposing wall surfaces 28 and 30 to adhere to each other. In other words, the opposing wall surfaces 28 and 30 of the narrow portion 22 have a narrow interval W2 in between and smooth surfaces without irregularities. Hence, the wall surfaces 28 and 30 are in an adhesion state via a water film F without having air remained in between. In this instance, an attraction effect or a pressure bonding effect is thought to be obtained by a difference of a water pressure and atmospheric pressure between the wall surfaces 28 and 30 as is shown in FIG. 5. In contrast, a typical sipe in the related art has a relatively wide groove width of about 0.6 to 1.5 mm and the arithmetic mean roughness Ra of 2.5 μm or greater as a surface roughness on the wall surfaces. Regarding a surface roughness, even when surfaces of the sipe plate are mirror surfaces before the attachment to the die surface, it is unavoidable for the surfaces to be roughened to a certain degree by sand blasting applied after the attachment. Consequently, the wall surfaces of a sipe shaped by the sipe plate in the related art may appear to be flat, but actually have the arithmetic mean roughness Ra of 2.5 μm or greater. A relatively wide sipe having rough surfaces on the wall surfaces as above cannot exert the attraction effect by water as described above. According to this embodiment, however, because an adhesion effect between the wall surfaces 28 and 30 can be obtained by providing the narrow portion 22 as above, rigidity of the block 16 can be increased. Consequently, deformation of the block 16 when making contact with the ground can be suppressed regardless of the sipe 18 provided to the block 16. Hence, not only can resistance to irregular wear be enhanced, but also an edge effect can be exerted and therefore ice performance can be enhanced.

According to this embodiment, the narrow portion 22 is surrounded by the wide portion 20, and the frame-like portion 56 provided on the three sides of the sipe plate 52 that shapes the narrow portion 22 and the wide portion 20 functions as a blade reinforcement frame to reinforce the thin plate portion 58 that shapes the narrow portion 22. Hence, breakage, such as breaking, of the sipe plate 52 can be suppressed.

According to this embodiment, the wide portion 20 is not provided to the narrow portion 22 on the side of the sipe bottom 26. Hence, the thick frame-like portion 56 is not present on the side of the tip end 66 of the thin plate portion 58 in the sipe plate 52 that shapes the wide portion 20 and the narrow portion 22. Consequently, resistance of the sipe plate 52 is small when pulled out from the surface of tread rubber at the time of die releasing of a tire and chipping of tread rubber can be suppressed. In addition, according to the present embodiment, because smoothness of the thin plate portion 58 of the sipe plate 52 is high, pulling resistance of the sipe plate 52 can be reduced.

Second Embodiment

Configurations of sipes and sipe plates according to a second embodiment will be described according to FIG. 6 through FIG. 8. A sipe 18A of the second embodiment is different from the counterpart in the first embodiment above in that at least one concave groove 32 extending in a sipe width direction D is provided to at least one of a pair of opposing wall surfaces 28 and 30 of a narrow portion 22.

More specifically, the concave groove 32 is provided to one wall surface 28 alone herein, and two concave grooves 32 spaced apart in a sipe length direction L are provided to the one wall surface 28. The concave groove 32 is a fine groove having a width W3 (a dimension of the concave groove 32 in the sipe length direction L) equal to or less than a width W2 of the narrow portion 22 (W3≤W2). A recess depth K1 of the concave groove 32 shown in FIG. 6 when viewed in a plane is set to be equal to or less than the width W2 of the narrow portion 22 (K1≤W2). As are shown in FIG. 7A and FIG. 7B, the concave grooves 32 are provided to the narrow portion 22 fully in a depth direction D and formed linearly from an upper side 22A to a sipe bottom 26 of the narrow portion 22.

Figure 8:
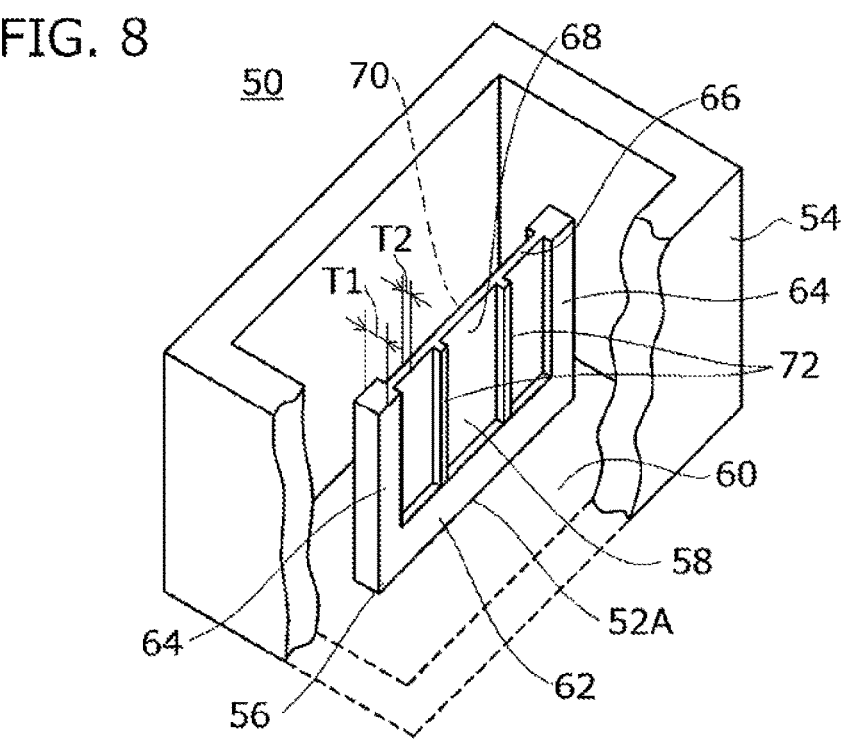
FIG. 8 is an enlarged perspective view of a major portion of a tire molding die to show a sipe plate according to the second embodiment.
Figure 9:
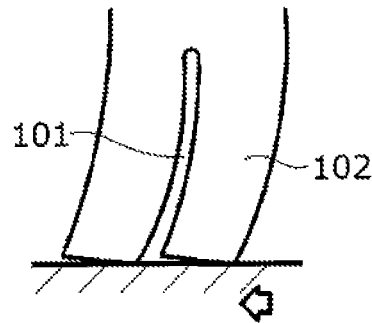
FIG. 9 is a sectional view of a block in the related art to show a state when a tire makes contact with the ground.

FIG. 8 shows a sipe plate 52A to shape the sipe 18A in a block 16. In order to shape the concave grooves 32, the sipe plate 52A is configured in such a manner that at least one convex ridge 72 extending in the sipe depth direction D is provided to at least one of a pair of side surfaces 68 and 70 of a thin plate portion 58. Herein, the convex ridge 72 is provided to one side surface 68 alone, and two convex ridges 72 spaced apart in the sipe length direction L are provided to the one side surface 68. As with the shape of the concave groove 32, a shape of the convex ridge 72 has a width equal to or less than a thickness T2 of the thin plate portion 58, and a protrusion height when viewed in a cross section is set to be equal to or less than the thickness T2. The convex ridges 72 are provided to the thin plate portion 58 fully in a height direction, and formed linearly from a lower end of the thin plate portion 58 to a tip end 66 of the sipe plate 52A.

According to the second embodiment, in addition to the function and the effect obtained in the first embodiment above, a function and an effect as follows can be obtained. That is, by providing the concave grooves 32 to the wall surface 28 of the narrow portion 22 of the sipe 18A, introduction of water into the narrow portion 22 can be accelerated. The concave grooves 32 thus serve to draw water into the narrow portion 22 and an adhesion action between the wall surfaces 28 and 30 described above can be exerted at an early stage by providing the concave grooves 32. Other configurations, functions, and effects of the second embodiment are the same as those of the first embodiment above, and a description is omitted herein.

Other Embodiments

In the embodiments above, the sipes 18 and 18A are closed sipes. However, the embodiments above may be applied also to a one-end open sipe that opens to the main groove at one end and terminates within the block at the other end, or a both-end open sipe that opens to the main grooves at the both ends. It is preferable to apply the embodiments above to closed sipes because deformation of the blocks 16 can be suppressed more effectively.

The embodiments above have described a case where the sipes 18 or 18A are provided to the blocks 16 as the land portions. However, the land portion to which the sipe 18 or 18A as above is to be provided not limited to a block and may be a rib continuing in the tire circumferential direction. The sipe configuration as above may be applied to all the land portions within a tread pattern or may be applied to only a part of the land portions within the tread pattern. For example, all the sipes within the tread pattern may have the wide portions and the narrow portions or some of all the sipes may have the wide portions and the narrow portions. In short, it is sufficient that at least one sipe including the wide portion and the narrow portion is provided to at least one land portion within the tread pattern.

The embodiments above are capable of improving ice performance and are therefore suitably applied, for example, to snow tires (studless tires or winter tires). Use of tires is not particularly limited, and tires can be tires for passenger cars or heavy load tires for trucks and buses.

A dimension, such as a width, of the sipes of the embodiments above is a dimension in a regular state under no load when a tire is attached to a regular rim and inflated to a regular internal pressure. There are several standard systems including standards for tires and the regular rim is a rim specified for each tire according to a standard included in the corresponding standard system. For example, the regular rim is a standard rim according to JATMA, a "design rim" according to TRA, and a "measuring rim" according to ETRTO. Likewise, the regular internal pressure is an air pressure specified for each tire according to a standard included in the standard system. The regular internal pressure is a maximum air pressure according to JATMA, a maxima value set forth in the table of "tire load limits at various cold inflation pressures" according to TRA, and an "inflation pressure" according to ETRTO.

EXAMPLES

In order to confirm the effects of the embodiments above, examples and comparative examples of heavy load pneumatic radial tires of a block pattern (size: 11R22.5 16P.R.) were prepared. The sipe configurations of the respective tires are set forth in Table 1 below and the other tire configurations are the same. Examples 1, 3 and 4 are cases having the sipe configuration without the concave grooves according to the first embodiment above shown in FIG. 2 and FIGS. 3A and 3B. Example 2 is a case having the sipe configuration with the concave grooves according to the second embodiment above shown in FIG. 6 and FIGS. 7A and 7B. Comparative Examples 1 and 2 are cases having a constant groove width across the sipe (having no variance in groove width). Comparative Example 3 is a case shown in FIG. 10 in which the wide portion 20 is provided to the sipe bottom 26 by surrounding the entire circumference of the narrow portion 22 of the sipe with the wide portion 20.

The arithmetic roughness Ra set forth in Table 1 below was measured in accordance with JIS B0601:2013 using a stylus surface roughness meter "E-35A" available from Tokyo Seimitsu Co., Ltd.

Each tire was evaluated in terms of resistance to irregular wear, durability of the sipe plate at the time of molding of a tire by vulcanization (durability of the sipe plate), and ease of pulling of the sipe plate (ease of removal from die) at the time of die releasing of a tire. Evaluation methods are as follows.

Figure 11:
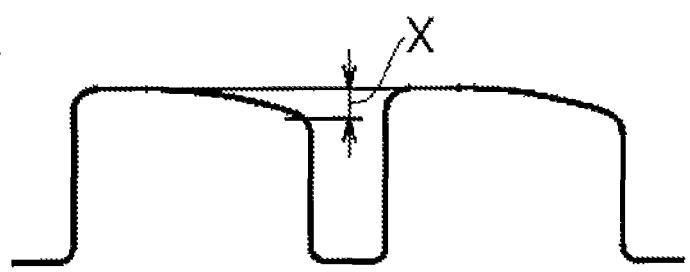
FIG. 11 is a schematic view showing an amount of step-like wear in evaluation of resistance to irregular wear.

That is, resistance to irregular wear was evaluated in the following manner. The tire was attached to a rim (22.5×7.50) and inflated to an internal pressure of 700 kPa. The tire was then attached to a drive shaft of a heavy truck having a vehicle total weight of 20 tons. The truck was run on a paved dry road and a road covered with snow and ice for predetermined travel distances (about 7000 km and about 25000 km) under a load condition of 80% of a maximum load. An amount of step-like wear, X (see FIG. 11), between one block and the following block in the tire circumferential direction was measured. In each travel distance, the resistance to irregular wear is represented as an index relative to a value of an amount of step-like wear in Comparative Example 1 which is taken as 100. The smaller the index number becomes, the more satisfactory is the resistance to irregular wear.

Durability of the sipe plate was evaluated by checking the number of breakages in the sipe plate after the die was used 3000 times for molding of tires by vulcanization.

Ease of removal from die was evaluated by checking the number of tires on which chipping of rubber occurred in sipe portions among 30 tires molded by vulcanization.

The results are set forth in Table I below. In comparison with Comparative Example 1 having wide sipes with rough surfaces, Comparative Example 2 having sipes with a narrower groove width can improve resistance to irregular wear. However, durability of the sipe plate is poor. On the other hand, in comparison with Comparative Example 1, an effect of improving resistance to irregular wear can be acknowledged in Comparative Example 3 having the sipes provided with the wide portion and the narrow portion. However, ease of pulling of the sipe plate is poor and chipping of rubber is found in the sipe portion. In contrast, according to Examples 1 through 4, resistance to irregular wear can be improved without deteriorating durability of the sipe plate and ease of pulling of the sipe plate. In particular, resistance to irregular wear can be improved markedly in Examples 1, 2, and 4 in which the wall surfaces of the narrow portions are made smooth in comparison with Example 3 in which the wall surfaces are not made smooth, not to mention Comparative Example 1. Also, a comparison between Example 1 and Example 2 reveals that resistance to irregular wear can be improved further by providing the concave grooves to the narrow portion.

TABLE 1

Figure 6:
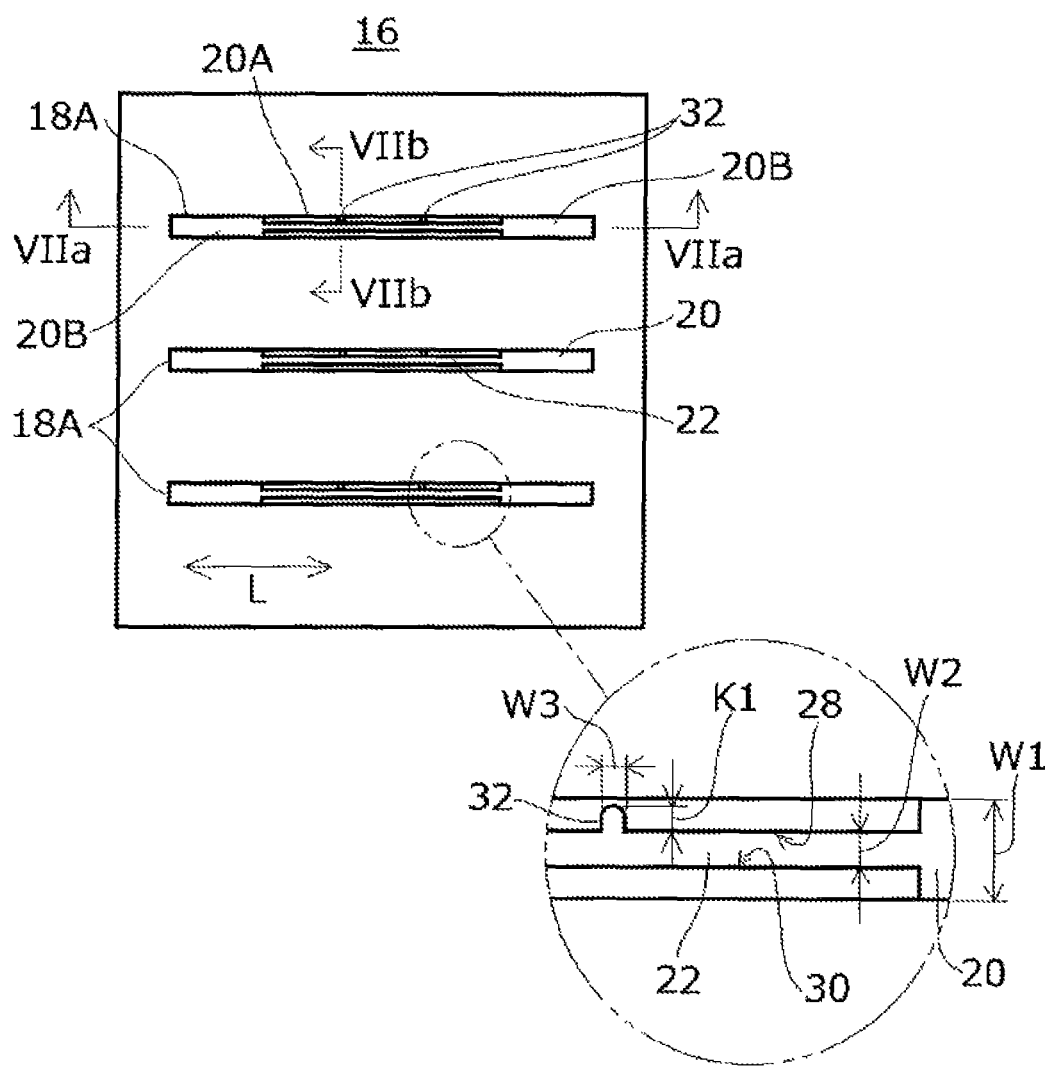
FIG. 6 is a plan view of a block according to a second embodiment with an inset showing a partially enlarged view.
Figure 7A:
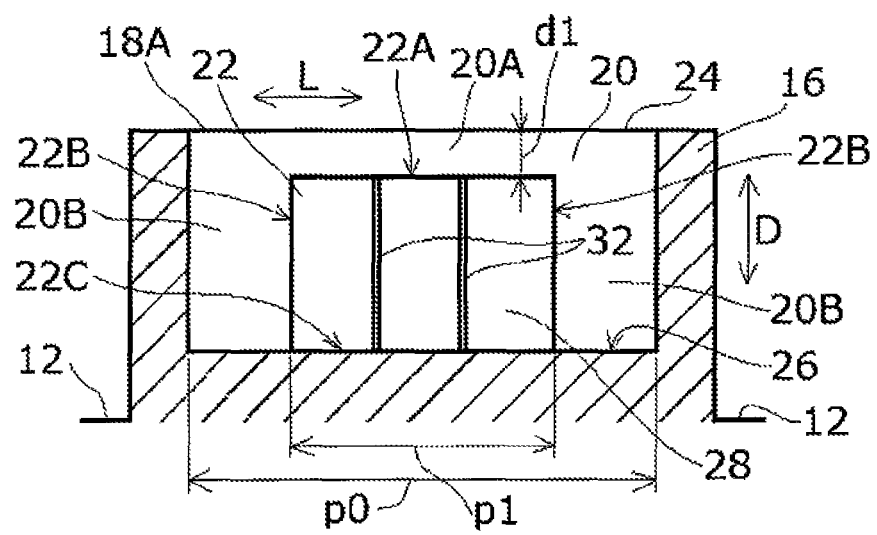
FIG. 7A is a sectional view taken along the line VIIa-VIIa of FIG. 6
Figure 7B:
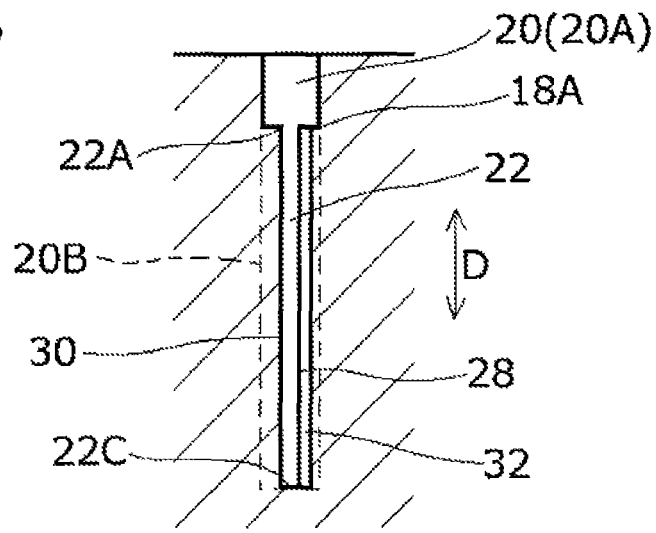
FIG. 7B is a sectional view taken along the line VIIb-VIIb of FIG. 6.
Figure 10:
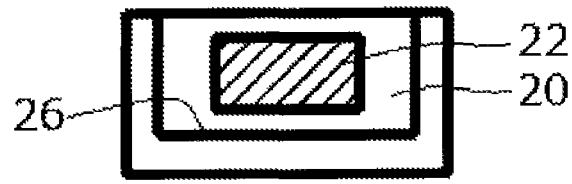
FIG. 10 is a sectional view of a block showing a sipe of Comparative Example 3.

| | Comparative Example 1 | Comparative Example 2 | Comparative Example 3 | Example 1 | Example 2 | Example 3 | Example 4 |
|---|---|---|---|---|---|---|---|
| Sipe configuration | No variance in groove width | No variance in groove width | FIG. 10 | FIG. 2, FIGS. 3A & 3B | FIG. 6, FIGS. 7A & 7B | FIG. 2, FIGS. 3A & 3B | FIG. 2, FIGS. 3A & 3B |
| Sipe width W (mm) | 0.8 | 0.3 | Wide: 0.8 Narrow: 0.3 | Wide: 0.8 Narrow: 0.3 | Wide: 0.8 Narrow: 0.3 | Wide: 0.8 Narrow: 0.3 | Wide: 0.8 Narrow: 0.3 |
| Sipe wall surface roughness Ra (μm) | 2.6 | 2.6 | Narrow: 2.6 | Narrow: 1.0 | Narrow: 1.0 | Narrow: 2.6 | Narrow: 1.5 |
| Presence of concave grooves | None | None | None | None | Presence | None | None |
| Distance d1 (mm) from sipe opening to narrow portion | — | — | 3 | 3 | 3 | 3 | 3 |
| Percentage (%) of dimension p1 of narrow portion to sipe full length p0 | — | — | 56 | 56 | 56 | 56 | 56 |
| Sipe plate surface roughness Ra (μm) | 3.0 | 3.0 | 3.0 | 1.3 | 1.3 | 3.0 | 1.8 |
| Amount of step-like wear when travelled for about 7000 km | 100 | 73 | 91 | 41 | 32 | 82 | 55 |
| Amount of step-like wear when travelled for about 25000 km | 100 | 71 | 88 | 65 | 56 | 79 | 68 |
| Durability of sipe plate (number of breakages) | 0 | 32 | 0 | 0 | 0 | 0 | 0 |
| Ease of removal from die (number of tires having rubber chipping) | 0 | 0 | 7 | 0 | 0 | 0 | 0 |

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A molding die of a pneumatic tire, comprising:
a sipe plate to shape a sipe in a land portion provided to a tread, wherein the sipe plate includes:
a frame-like portion comprising a lower frame portion extending along a root portion to a molding die main body and side frame portions extending in a height direction from both ends of the lower frame portion;
a thin plate portion having a thickness thinner than a thickness of the frame-like portion, which is surrounded by the frame-like portion on three sides except for a tip end side corresponding to a sipe bottom and extends to a tip end;
the thin plate portion has a thickness of 0.6 mm or less and an arithmetic mean roughness Ra of 1.8 μm or less on a pair of side surfaces that shape a pair of opposing wall surfaces of the sipe;
a dimension of the thin plate portion in the sipe length direction accounts for 50 to 80% of a full length of the sipe; and
wherein the sipe plate consists of a single metal plate; and the sipe plate serves to shape a closed sipe that terminates within the land portion at both ends in a sipe length direction.

2. The molding die of a pneumatic tire according to claim 1, wherein:
at least one convex ridge extending in a sipe depth direction is provided to at least one of a pair of the side surfaces of the thin plate portion.

3. The molding die of a pneumatic tire according to claim 2, wherein:
a width of the convex ridge is equal to or less than the thickness of the thin plate portion and a protrusion height of the convex ridge when viewed in a cross section is equal to or less than the thickness of the thin plate portion.

4. The molding die of a pneumatic tire according to claim 1, wherein: one or two convex ridges extending in a sipe depth direction are provided to one of the pair of the side surfaces of the thin plate portion.

5. The molding die of a pneumatic tire according to claim 1, wherein: the thin plate portion has a different arithmetic mean roughness Ra than the frame-like portion.

6. The molding die of a pneumatic tire according to claim 5, wherein: the frame-like portion has an arithmetic mean roughness Ra of 2.5 μm or greater on a pair of side surfaces.

* * * * *